(12) United States Patent
Tan et al.

(10) Patent No.: US 6,697,534 B1
(45) Date of Patent: Feb. 24, 2004

(54) METHOD AND APPARATUS FOR ADAPTIVELY SHARPENING LOCAL IMAGE CONTENT OF AN IMAGE

(75) Inventors: Yap-Peng Tan, Chandler, AZ (US); Ping-Sing Tsai, Gilbert, AZ (US); Tinku Acharya, Tempe, AZ (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/328,935

(22) Filed: Jun. 9, 1999

(51) Int. Cl.$^7$ .............................. G06T 5/00; G06T 7/00
(52) U.S. Cl. ...................... 382/261; 382/266; 382/274; 382/195
(58) Field of Search ................................ 382/260, 261, 382/263, 266, 274, 195, 205

(56) References Cited

U.S. PATENT DOCUMENTS

| | | | |
|---|---|---|---|
| 5,003,618 A | * 3/1991 | Meno | 382/261 |
| 5,875,122 A | 2/1999 | Acharya | 708/407 |
| 5,995,210 A | 11/1999 | Acharya | |
| 6,009,201 A | 12/1999 | Acharya | |
| 6,009,206 A | 12/1999 | Acharya | |
| 6,047,303 A | 4/2000 | Acharya | |
| 6,078,686 A | * 6/2000 | Kim | 382/260 |
| 6,091,851 A | 7/2000 | Acharya | |
| 6,094,508 A | 7/2000 | Acharya et al. | |
| 6,097,847 A | * 8/2000 | Inoue | 382/263 |
| 6,108,453 A | 8/2000 | Acharya | |
| 6,124,811 A | 9/2000 | Acharya et al. | |
| 6,130,960 A | 10/2000 | Acharya | |
| 6,151,069 A | 11/2000 | Dunton et al. | |
| 6,151,415 A | 11/2000 | Acharya et al. | |
| 6,154,493 A | 11/2000 | Acharya et al. | |
| 6,166,664 A | 12/2000 | Acharya | |
| 6,178,269 B1 | 1/2001 | Acharya | |
| 6,195,026 B1 | 2/2001 | Acharya | |
| 6,215,908 B1 | 4/2001 | Pazmino et al. | |
| 6,215,916 B1 | 4/2001 | Acharya | |
| 6,229,578 B1 | 5/2001 | Acharya et al. | |
| 6,233,358 B1 | 5/2001 | Acharya | |
| 6,236,433 B1 | 5/2001 | Acharya et al. | |
| 6,236,765 B1 | 5/2001 | Acharya | |
| 6,275,206 B1 | 8/2001 | Tsai et al. | |
| 6,285,796 B1 | 9/2001 | Acharya et al. | |
| 6,301,392 B1 | 10/2001 | Acharya | |
| 6,348,929 B1 | 2/2002 | Acharya et al. | |
| 6,356,276 B1 | 3/2002 | Acharya | |
| 6,366,692 B1 | 4/2002 | Acharya | |
| 6,366,694 B1 | 4/2002 | Acharya | |
| 6,373,992 B1 | * 4/2002 | Nagao | 382/266 |
| 6,377,280 B1 | 4/2002 | Acharya et al. | |
| 6,381,357 B1 | 4/2002 | Tan et al. | |
| 6,392,699 B1 | 5/2002 | Acharya | |

* cited by examiner

*Primary Examiner*—Scott Rogers
(74) *Attorney, Agent, or Firm*—Sharon Wong (57) ABSTRACT

Briefly, in accordance with one embodiment of the invention, a method of sharpening an image includes the following. A crispening parameter is adaptively computed for a local region of a captured image based, at least in part, on a measure of the local contrast and the local brightness. A kernel is applied to the local region of the captured image using the adaptively computed crispening parameter.

24 Claims, 6 Drawing Sheets

$\lambda$ = lambda

| 0 | $-\lambda/4$ | 0 |
|---|---|---|
| $-\lambda/4$ | $\lambda$ | $-\lambda/4$ |
| 0 | $-\lambda/4$ | 0 |

$\lambda$ = lambda

| $-\lambda/9$ | $-\lambda/9$ | $-\lambda/9$ |
|---|---|---|
| $-\lambda/9$ | $8\lambda/9$ | $-\lambda/9$ |
| $-\lambda/9$ | $-\lambda/9$ | $-\lambda/9$ |

METHOD AND APPARATUS FOR ADAPTIVELY SHARPENING LOCAL IMAGE CONTENT OF AN IMAGE

RELATED APPLICATION

This patent application is related to U.S. patent application Ser. No. 09/320,192, titled "Method and Apparatus for Adaptively Sharpening an Image," by Tsai et al., filed May 26, 1999, assigned to the assignee of the present invention and herein incorporated by reference.

BACKGROUND

1. Field

The present invention relates to sharpening an image and, more particularly, to adaptively sharpening local image content of an image.

2. Background Information

In digital imaging systems, image sharpening, sometimes referred to as "crispening," is employed to enhance the image by removing the blurring effect introduced, typically, by different signal processing and/or optical filtering operations. A variety of "sharpening kernels" are typically employed in this process. Usually this involves applying a convolution of the sharpening kernel with the blurred image. One approach is to apply a fixed kernel to sharpen an image or set of images. Another approach is to allow the sharpness to be modified based on human judgement. For example, the Photoshop® software product available from Adobe Systems, Inc., employs this latter approach. However, a fixed kernel does not produce good results in some situations, such as where the image characteristics are varying, and manual adjustment is not practical in some situations, such as where video is being employed. A need, therefore, exists for a process or technique that at least in part addresses the foregoing shortcomings.

SUMMARY

Briefly, in accordance with one embodiment of the invention, a method of sharpening an image includes the following. A crispening parameter is adaptively computed for a local region of a captured image based, at least in part, on a measure of the local contrast and the local brightness. A kernel is applied to the local region of the captured image using the adaptively computed crispening parameter.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

As previously described, typically, image sharpening is employed to enhance an image by removing a blurring effect that may be introduced by different types of signal processing and/or optical filtering operations. A variety of kernels may be employed to accomplish this result, sometimes referred to as sharpening kernels, depending on the impact of the kernel on images to which it is applied. Typically, this process involves applying a convolution of the kernel with the image, such as a blurred image. Typically, the kernel is applied on a pixel-by-pixel basis. Of course, the invention is not limited in scope to an image having a particular size or resolution. Likewise, the invention is not limited in scope to any particular spatial coding or spatial color coding technique. For example, the well-known $YC_rC_b$ or RGB (Red-Green-Blue) color space formats, just to provide two examples, may be employed, Although a variety of different formats are frequently employed, and the invention is not restricted in scope to any particular color space format. In the former color space format, Y comprises the luminance component, and $C_r$ and $C_b$ comprise the chrominance components. Nonetheless, as previously described, in order to appear visually pleasing, it may be desirable not to apply a fixed kernel to different images, especially where a variety of image types, classes, or categories are being processed, and the images, therefore, have different characteristics. Likewise, employing human judgement to adjust the sharpness of an image or series of images is frequently not practical or desirable. Even adaptive processing based at least in part on image content may, in some circumstances, provide mixed results. For example, where an image includes a low frequency, flat region and a high frequency, colorful, high contrast region, an embodiment in accordance with the approach described in the aforementioned patent application, "A Method of Adaptively Sharpening an Image," that applies a single crispening parameter to an entire image may produce a crispening parameter that over sharpens in one region and under sharpens in the other, rather than separately sharpening the two characteristically different types of content within the one image using two different crispening parameters. Of course, as will be come clear later, applying different amounts or levels of sharpening over a single image may introduce additional computational complexity or burden, but the results may produce higher quality or more visually pleasing images.

Figure 1:
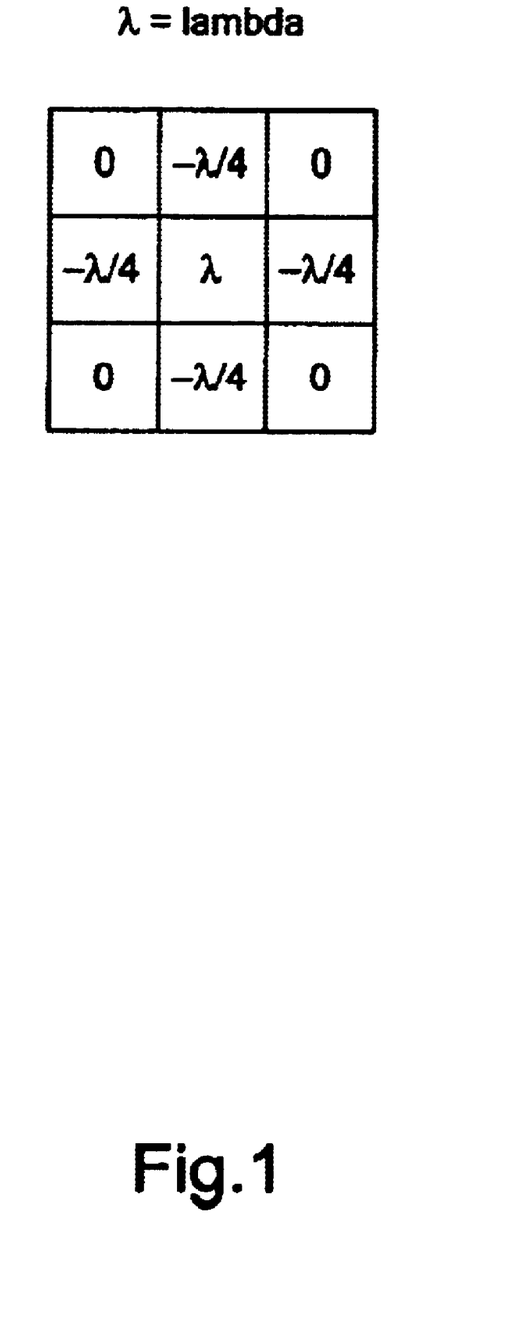
FIG. 1 is a table illustrating a commonly used kernel, such as may be employed in an embodiment in accordance with the present invention.

FIG. 1 is a diagram illustrating a commonly employed sharpening kernel. This is referred to as a sharpening kernel because the greater the value of "lambda" ($\lambda$), the more the kernel sharpens the image. Therefore, the lower the value of lambda, the less sharp the kernel makes the image. Therefore, the parameter "lambda" may be adjusted to control or adjust the sharpness of the resulting image. In this context, this is referred to as a "crispening parameter." In one approach, this crispening parameter, lambda in this particular embodiment, may be tuned based, at least in part, on the content of the image, and, in particular, based, at least in part, on local content of the image. More particularly, an adaptive method or process may be employed to determine or compute the crispening parameter for a local region of a captured image based, at least in part, upon the content of the captured image in the identified or selected local region, in this case based, at least in part, on a measure of the local contrast and the local brightness of the captured image. In a particular embodiment, the crispening parameter may be computed based, at least in part, on a measure of the amount of the local contrast and the degree of local brightness of the captured image at a selected pixel, although the invention is not limited in scope in this respect. Therefore, for this particular embodiment, the local region is defined with respect to a particular or selected pixel, and, therefore, in this embodiment, the crispening parameter may change on a pixel-by-pixel basis, depending on the local content of the image, although, again, the invention is not restricted in scope in this respect. In this context, the amount of local contrast with respect to a selected pixel refers to the range of intensities, measured over a set of pixels that are near the location of and including the selected pixel. Typically, the term "local" refers to set of pixels that are contiguous, and in this particular example, specifically near a selected pixel, although the invention is not limited in scope to "local" referring to contiguous pixels or to being defined with respect to a particular pixel. For example, as another alternative, the term local may refer to a segmented portion of a partitioned image. Likewise, in this context, the degree of local brightness at a selected pixel refers to the overall intensity of the image local to or near that selected pixel; whereas, the degree of brightness at a selected pixel, in this context, refers to the intensity of the image at that pixel location. Of course, the degree of local brightness then is a super set of the degree of brightness in this context. In this particular embodiment, once the crispening parameter for that pixel is adaptively computed based at least in part on the content of the image, the kernel is applied to that pixel of the captured image using the computed parameter, although, again, the invention is not restricted in scope in this respect. For example, in an alternative embodiment, where the image is partitioned into nonoverlapping regions, different crispening parameters may be applied adaptively on a region-by-region basis.

For this particular embodiment, however, the relationship between the crispening parameter and the content of the captured image may be expressed by the following equation:

$$\text{lambda}[I(m,n)] = F[C_{I(m,n)}, L_{I(m,n)}] \quad (1)$$

where lambda[I(m,n)] is the crispening parameter computed for image I for a pixel at location (m,n) based at least in part on the local content of the image at that pixel location, F is a defined function of C and L, and C is a measure of the local contrast of the image I with respect to the pixel at location (m,n), and L is a measure of the degree of brightness of the image I at that pixel location. For a sharpened image, $I_s$, an original image, I, a crispening parameter, lambda ($\lambda$), and a filter operation, H, the sharpened image may be computed as follows in this particular embodiment:

$$I_s(m,n) = I(m,n) + \text{lambda}[I(m,n)] \times H[I(m,n)], \quad (1.5)$$

where $I_s(m,n)$ and $I(m,n)$ respectively indicate the content of the sharpened and original images at pixel location (m,n), lambda[I(m,n)] indicates that the crispening parameter may vary on a pixel-by-pixel basis depending on the content of image I, and H[I(m,n)], in this context, denotes a convolution that results from applying the H operator to image I, in this particular embodiment. Relationship (1.5) indicates, in the form of an equation, the result of convolving the kernel with the original image to obtain a sharpened image, in this particular embodiment. Relationship (1) is based, at least in part, on the observation that a greater amount of sharpening may be applied to content exhibiting greater contrast. If the same amount of sharpening were to be applied to two images, one having less contrast than the other, the image with less contrast would be perceived, after sharpening, as less visually pleasing because the amplification of noise caused by the sharpening would be more easily perceived. A potential reason for this is that high contrast images typically include more high frequency signal information that a low contrast image. Likewise, the greater amount of sharpening that is applied, the greater the high frequency noise is enhanced; however, where this occurs for a high contrast image, the amplification of the high frequency noise is less noticeable due at least in part to the presence of other high frequency signal information. Nonetheless, the precise amount of sharpening to apply for a given amount of contrast is determined thorough the application of heuristics and tuning, rather than being derived. As shall be explained in more detail hereinafter, application of such techniques indicates that more sharpening may be applied where the luminance is in a mid-range of potential values, and less sharpening is desirable where the luminance is either above or below this mid-range. A reason for this is that, where the luminance is low, the amplification of the noise will be more noticeable relative to the content of the image, whereas, where the luminance is high, although the amplification of the noise is less noticeable, likewise, the sharpening is also less noticeable, and, therefore, it may not be worth the computation resources it takes to apply the sharpening in that situation. Typically, it is the computation of the local contrast that consumes significant computational resources for this particular embodiment. Therefore, in an embodiment in which computation resources are a premium, it may be desirable to forego computing the local contrast where the local image content is either above or below a mid-range level of luminance, although the invention is not limited in scope in this respect.

As previously indicated, one situation in which the approach indicated above by (1) and (1.5) may be desirable is in real-time image processing applications, such as video applications. For example, in low-bit rate video coding and/or decoding, although the invention is not limited in scope in this respect, compression and decompression of an image typically results in the visibility of coding artifacts. The coding is employed in order to transmit the image or sequence of images over a limited bandwidth communications channel. Another advantage of this approach is that if the sharpening is applied at the far end of the communications channel, then the crispening parameter may be adjusted based, at least in part, on the particular display device and/or other aspects of the particular transmission that occurs. In addition, applying sharpening prior to transmission, where compression is being employed, may reduce compression efficiency due to the increase of the high frequency components as a result of applying sharpening. This suggests, in this context, that it may be more desirable to apply the sharpening at the far end, as indicated above, however, again, the invention is not limited in scope in this respect. Another situation in which sharpening may be desirable is with use of a still image digital camera, for example. Typically, such cameras employ anti-aliasing filters for the camera sensor; however, these filters may introducing blurring that a sharpening filter may be employed to reduce. Likewise, encoding and/or compression may also be employed in other situations, such as to reduce the amount of storage for an image, etc. Nonetheless, various processing techniques, such as image sharpening, may be employed in order to address the blurring that may result, for example, either due to the compression/decompression of the image or due to the filtering applied to the image to remove artifacts that resulted from the coding/decoding.

Figure 2:
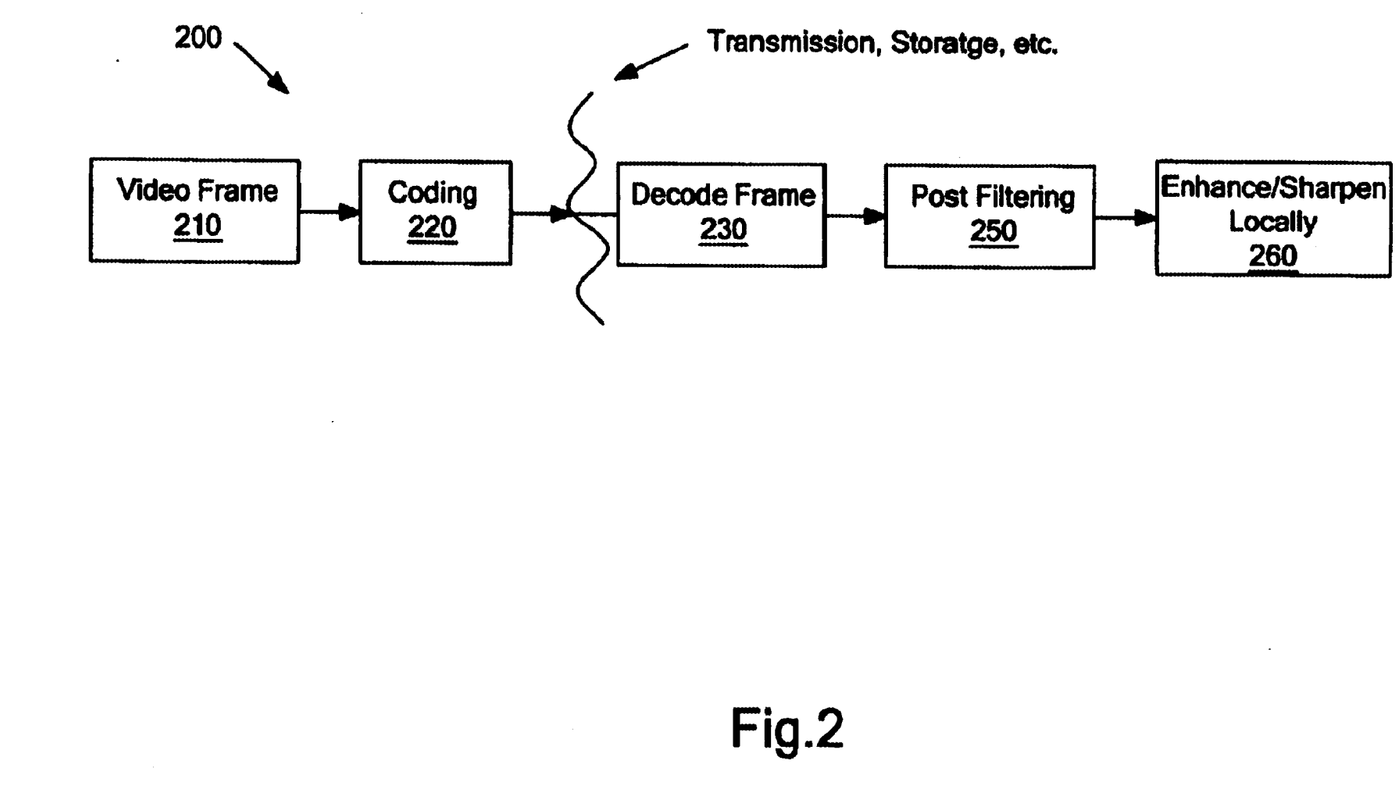
FIG. 2 is a diagram illustrating an embodiment of a system that may employ an embodiment of a method of sharpening an image in accordance with the present invention.

FIG. 2 is a block diagram illustrating one embodiment in which this type of processing may be employed. As illustrated by embodiment 200 in FIG. 2, after coding the video frame, as illustrated by block 220, the coded signals are transmitted via a communications channel (not shown). For example, this communications channel may comprise a wire line or wireless communications system, it may be broadcast, multi-cast, packet switched, or circuit switched, to provide a few examples. Then, as illustrated by block 230, in this embodiment, the video frame is decoded at the far end from the received signals. In this particular embodiment post-process filtering may be employed, for example, to remove artifacts, although the invention is not limited in scope in this respect. This is indicated in FIG. 2 by block 250. However, as a result, the image may be blurred so it may be desirable to apply a kernel to further enhance the image. As previously indicated, one difficulty is that in the case of video, scene or lighting condition changes may occur without advance indication, making it difficult to apply an appropriate fixed kernel to make the frames or images all or mostly all as visually appealing as desired. Furthermore, even applying the same kernel over an entire image may not be desirable because within one image a variety of different content may be present, as previously described. Therefore, it may be desirable to "tune" the crispening parameter based at least in part on the content of the image at a particular or selected pixel of the image. Therefore, in one embodiment, changes in lighting or scene may be detected and the kernel to be applied may be adaptively changed. It will, of course, be appreciated that the invention is not limited in scope to use with compression/coding and/or decompression/decoding or any particular form of coding/compression and/or decoding/decompression. However, where this is employed, MPEG4, ISO/IEC JTC1/SC29/WG11, Coding of Moving Pictures and Audio, Overview of the MPEG-4 Standard (Seoul Version), March 1999, H.263 V.2, ITU-T Recommendation H.263 Version 2 (Draft), Video Coding for Low Bit Rate Communication, Jan 27, 1998, for example, or anyone of a number of other approaches may be employed.

For video frames in the $YC_rC_b$ color space format, signal information contained in the image is divided into two chroma planes, $C_r$ and $C_b$, as well as a luminance plane, Y. As previously described, image sharpening is performed on a pixel-by-pixel basis for a given video frame in this particular embodiment, although, again, the invention is not restricted in scope in this respect. One advantage of this particular embodiment is that there is no need to partition or segment the image in order to apply sharpening locally, and, likewise, artifacts that may appear due to boundary conditions between partitioned regions is not an issue. Furthermore, applying sharpening at a particular pixel based, at least in part, on the local contrast around that pixel has the desirable effect of reducing the rate of change of the sharpening as the sharpening applied changes based on the image content from pixel to pixel. It is desirable that the applied sharpening not change too much from pixel to pixel in an image, for example, because significant changes in sharpening tend to make the image appear less visually pleasing. Furthermore, the "window" around the pixel that may be employed in order to determine the local contrast is not limited to a particular size or shape. It need not be square or even have four corners. A larger "window", of course, results in more signal information in order to compute the crispening parameter; however, this is also more computationally demanding. Therefore, it may be desirable to "tune" the size and/or shape of the window. Likewise, the window for computing local contrast need not be the same as or have any specific relationship with the size and/or shape of the kernel being applied. As with the window, however, the kernel is not limited to a particular size or shape, and, therefore, need not be square or even have four corners. However, again, the larger the kernel, the more computationally demanding it is to apply the kernel to perform image sharpening.

Figure 3:
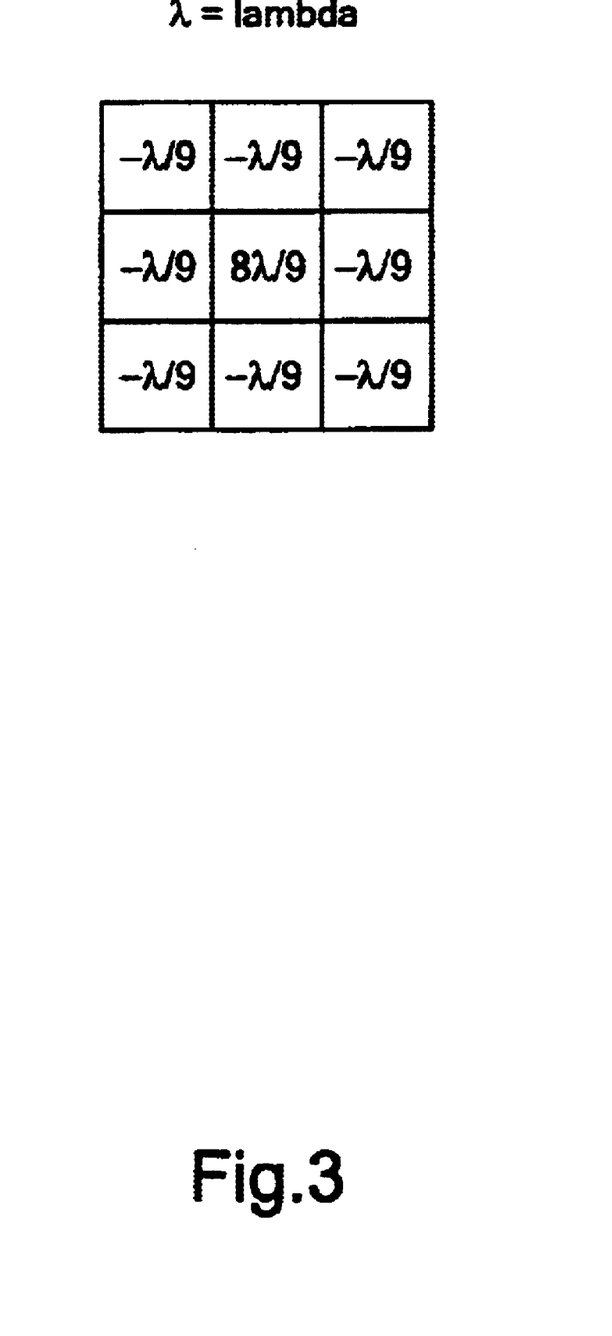
FIG. 3 is a table illustrating another commonly used kernel, such as may be employed in an embodiment in accordance with the present invention.

It is, of course, assumed for this particular embodiment that a video frame comprises a digital image with each pixel location having color space signal information in a binary digital signal format, although the invention is not limited in scope in this respect. In one embodiment, where a $YC_rC_b$ color space format is employed, the luminance plane signal information may be employed alone, as explained in more detail hereinafter. Of course, as previously indicated, any one of a number of color space coordinate systems may be used and the invention is not limited in scope to a particular color space coordinate system or to the use of color space at all. For example, in an alternative embodiment, the RGB color space format may be employed. In another example, gray scaling may be employed. Furthermore, any storage format may be employed to store the associated signals. Likewise, although this particular embodiment employs the kernel shown in FIG. 1, the invention is not limited in scope in this respect. A variety of well-known operators for use in image sharpening may be employed, such as, for example, those described in the textbook *Fundamentals of Digital Image Processing* by Anil Jain, published by Prentice Hall, 1989, as long as the kernel is adjustable, such as by varying a parameter. Thus, another additional example of a kernel that may be employed is provided in FIG. 3.

Likewise, it is noted that, although in this particular embodiment, kernel processing is performed in a spatial domain, the invention is not limited in scope in this respect. Therefore, an adaptive sharpening process may be performed in any suitable domain desired, such as the fourier transform, discrete cosine transform, or wavelet transform domain. It is, likewise, noted that any one of a number of coding or compression schemes may also be employed to compress the frame or image. For example, a lossy or lossless compression scheme may be employed. It will be appreciated that the choice of compression scheme may vary with a variety of factors, such as available bandwidth, available processing capability, etc. As one example, differential encoding, such as differential pulse code modulation (DPCM) encoding, may be employed. Again, the invention is not limited in scope to any particular coding and/or compression scheme. Furthermore, an embodiment of a method of sharpening an image in accordance with the present invention may also be employed or applied where no coding or compression has occurred, as previously indicated. However, in this particular embodiment, once the encoded video frame has been received at the far end of the communications channel, it may be decoded to produce a representation of the original video frame. Typically, the inverse of the process performed to code or compress the video frame is performed in order to decode or decompress the video frame.

As indicated, an embodiment of a sharpening technique in accordance with the present invention may be applied to transmited video frames after being decompressed at the far end of a communications channel to enhance the received decoded video frames. Likewise, a sharpening technique in accordance with the invention may also be employed to enhanced stored video frames that have been decompressed for playback, in an alternative embodiment. In such an embodiment, of course, the coded or compressed video frame is not transmitted via a communications channel, but, nonetheless, it may be stored, such as on a hard drive or other storage medium, and then, may be read or accessed when it is desired to view the video frame or image. When it is read or accessed, the coded or compressed image is decoded or decompressed, and then may be sharpened in accordance with the present invention. The processing employed in this particular embodiment may, therefore, be substantially similar to that employed in an embodiment in which enhancement and decompression after transmission by a communications channel occurs. Likewise, many other transmission or storage embodiments that employ image sharpening other than those described are possible and within the scope of the present invention.

In accordance with yet another embodiment, rather than applying this adaptive technique to an entire image, it may be applied to only a selected portion of an image, such as a region or subregion of the image. Therefore, no kernel may be applied to the nonselected remaining other regions or portions in such an embodiment, or alternatively, a fixed kernel may be applied to these regions. This approach may, for example, be computationally less demanding and in a situation where selected portions of the image are of interest, or for other reasons, this approach may be desirable. Likewise, in an alternative embodiment, different kernels may be applied adaptively to different portions of the image, each kernel, however, being modified adaptively using a technique in accordance with the present invention. As just one example, as an illustration, it may be determined that certain kernels are better for sharpening high frequency images or certain kernels are better for sharpening low frequency images. Therefore, it may be desirable to subdivide an image into high and low frequency portions and apply these kernels separately to the different respective corresponding portions. Of course, this implies that in addition to lambda varying, the H operator, as previously described, may also be varied, depending on the particular image, I. Likewise, in yet another embodiment, as discussed above, instead of computing lambda on a pixel-by-pixel basis, it may be desirable in some situations to compute lambda on a region or subregion basis. Therefore, in such an embodiment, the image may be partitioned and lambda computed for each partition, for example. An advantage of this approach, as suggest for one of the alternative approaches above, is less computational demands; however, such an approach may produce lower quality results in terms of sharpening. Likewise, it may be desirable to smooth the lambdas between regions due the possibility of artifacts resulting from boundary conditions associated with the application of different lambdas on a region by region basis.

Many alternative embodiments in accordance with the present invention are possible, and the invention is not restricted in scope to any one particular embodiment. For example, embodiments may include a video or image processing system, a method of processing a video frame or an image, and a storage medium having instructions stored thereon that when executed by a system, such as a personal computer, for example, result in the execution of an embodiment of a method of processing a video frame or image in accordance with the present invention.

Figure 6:
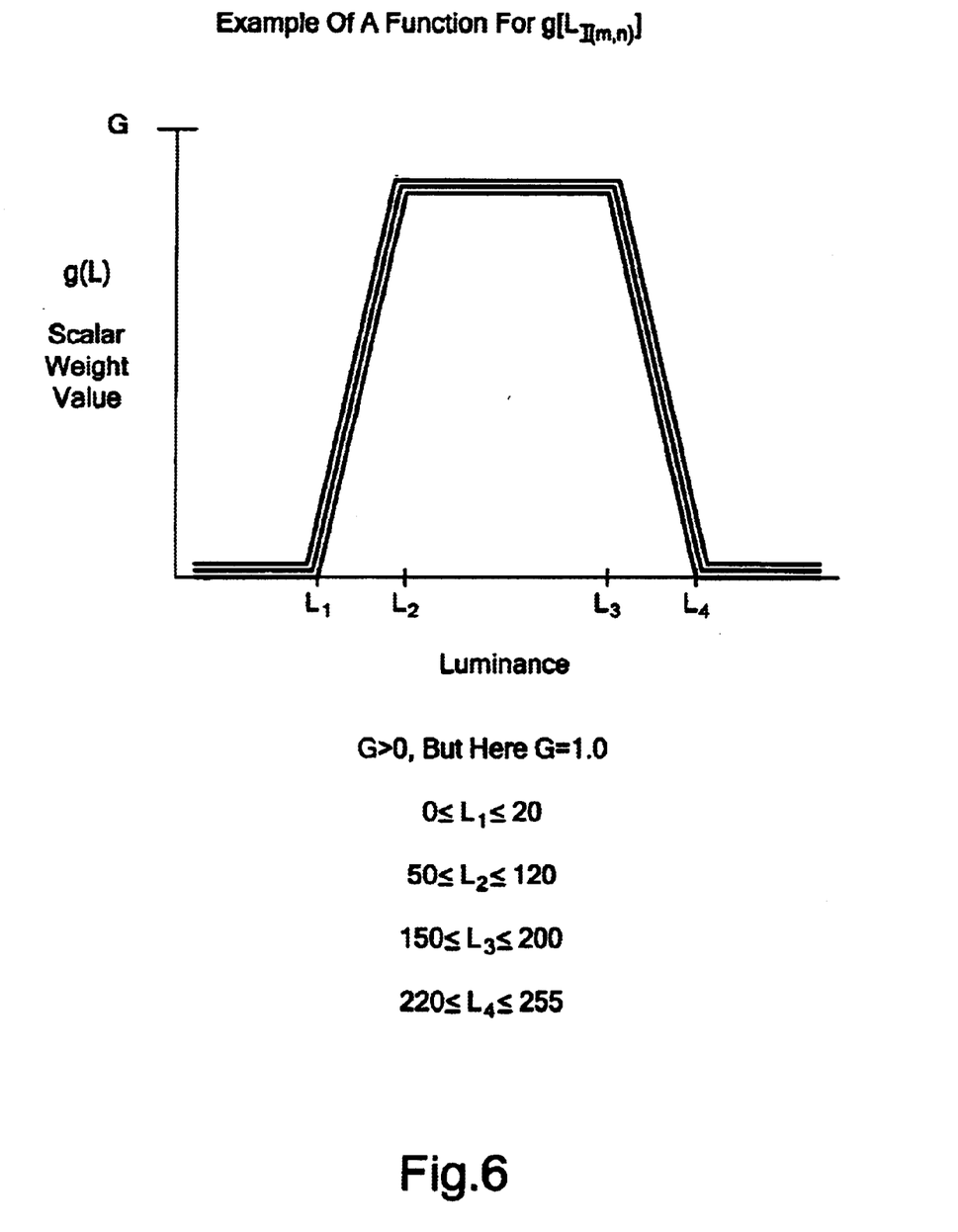
FIG. 6 is a plot illustrating an embodiment of a function that may be employed in an embodiment of a method of sharpening am image in accordance with the invention.

As previously described, the crispening parameter for a captured image with respect to a particular or selected pixel may be computed adaptively based, at least in part, on a measure of the local contrast and local brightness of the captured image with respect to a particular or selected pixel. It will, of course, be understood that any one of a number of different measures of the local contrast of an image and the local brightness of an image with respect to a pixel may be employed; however, in this particular embodiment, the amount of local contrast with respect to a pixel is measured based, at least in part, on the variance for the luminance of the pixels of the captured image in a local region around that pixel and the degree of local brightness is measured based, at least in part, on the luminance at that pixel location. Therefore, in this particular embodiment, adaptively computing the crisping parameter locally for the captured image comprises, at least in part, computing a crispening parameter adaptively with respect to a particular or selected pixel in the captured image. In this embodiment, a measure of the amount of local contrast with respect to a pixel is based, at least in part, on defining or selecting a region local to the pixel and computing the variance of the luminance of the pixels of the captured image in that region. Of course, where the variance is employed, it is desirable to remove the mean of the distribution of luminosity. In this embodiment, a measure of the degree of local brightness with respect to a pixel is based, at least in part, on the brightness of the captured image at that pixel location, that is, in this embodiment, the luminance. The crispening parameter is then computed, in this embodiment, based, at least in part, on a weighting of the measured local contrast based, at least in part, the measured degree of brightness. More particularly, the greater the local contrast, the greater the lambda, because, as previously indicated, in higher contrast regions it is possible to tolerate more sharpness. Likewise, as previously indicated, if the measure of the degree of brightness is in a mid-range, then lambda is greater; however, if the measure is in the high or low extreme ranges, then lambda is lower. In this particular embodiment, this comprises computing the crispening parameter with respect to a particular or selected pixel substantially in accordance with the following relationship:

$$\text{Lambda}[I(m,n)] = g(L_{I(m,n)}) \times C_{I(m,n)} \qquad (2)$$

where $g(L_{I(m,n)})$, in this particular embodiment, is a weighting scalar that depends, at least in part, on the local luminance around pixel (m,n), and $C_{I(m,n)}$ is local contrast around pixel (m,n). In this embodiment, function g has the form illustrated in FIG. 6. For this embodiment, the specific values for $L_1$, $L_2$, $L_3$, and $L_4$ will depend at least in part on the images of the target application to which sharpening is to be applied. Potential ranges for these are provided in FIG. 6. Likewise, G may be any value and may be used for normalization, but, in this example, G is one. This function was determined by testing and fine-tuning using heuristic approaches, such as varying the local luminance of contrast of an image in a controlled manner and measuring human perceptions of the effect. Any one of a number of different heuristic approaches may be employed, and the invention is not restricted in scope to a particular function g or to a particular approach to obtain a function g. For example, g may be based on another measure of intensity or brightness other than luminance, such as where another color space format is being employed. Likewise, g may be based on a combination of local contrast and local brightness or anyone of a number of other possible parameters that reflect local image content. One advantage of this particular embodiment, as reflect by relationship (2) above, is that the trade-off between computational burden and image quality is taken into account. More specifically, it may be possible to produce higher quality results using a different relationship to compute the crispening parameter; however, it is believed that in general, those approaches will typically impose a greater computational burden.

Figure 4:
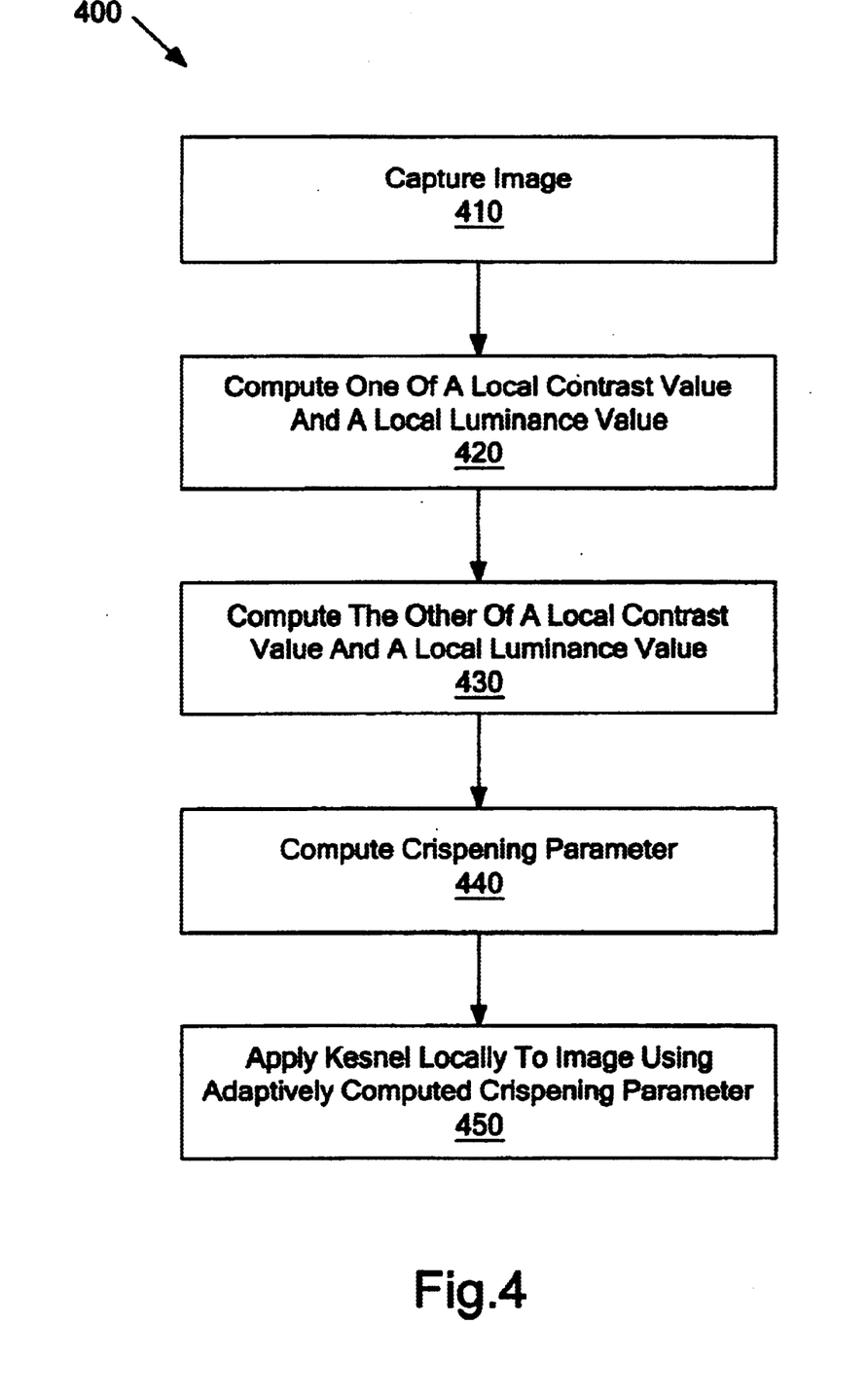
FIG. 4 is a flowchart illustrating an embodiment of a method of sharpening an image in accordance with the invention.

In this embodiment, the contrast was computed by defining a local region around pixel (m,n) and computing the variance of the luminance for those pixels over that region, although, of course, the invention is not restricted in scope to this approach to computing contrast. For equation (2), the local contrast was determined by forming a distribution and then computing the variance, as described, for example, in the text *CRC Standard Mathematical Tables*, by William H. Beyer, published by CRC Press, Inc., ISBN number: 0-8493-0628-0, although, as indicated, a number of other measures of local contrast may alternatively be employed. For example, image content values other than the luminance may be employed, such as, for example, if other color space formats are being employed. Likewise, instead of the variance, a computation based on a gradient or other type of difference operator might be employed. For example, the difference between the greatest and smallest luminance over the region divided by the sum is one example of an alternative measure. Of course, it may be desirable to modify equation (2) above to reflect the different measures where that equation or a variant thereof is being employed. Of course, although the relationship in equation (2) provides acceptable results, as explained in more detail below, it is well-understood that the invention is not restricted in scope to this relationship. Other relationships may also provide acceptable results. Furthermore, it may be that certain relationships provide better results for certain classes or categories of images or certain sets of image characteristics. Therefore, for those categories, or classes, for example, it may be desirable to employ a different relationship to compute the crispening parameter, in this embodiment, lambda. FIG. 4 is a flowchart Illustrating a particular embodiment, such as previously described.

Of course, once lambda is determined for a particular pixel, then, the particular kernel may be applied to that pixel of the captured image using the adaptively computed crispening parameter, in this case, lambda. As previously indicated, this approach may be applied to any image, regardless of format or color space. For example, where the $YC_rC_b$ color space format is employed, the relationships above are applied to the luminance plane signal information. Likewise, once lambda is determined for a particular pixel of a captured image, the kernel is then applied, to the luminance plane signal information for that pixel of the captured image. This is because that plane contains all the non-color signal information for the image, and, therefore, processing the other planes is unnecessary. In contrast, if the RGB color space format is employed, then the relationships above may, in one embodiment, be applied to the green plane; however, once lambda is determined, then the kernel is applied to all three color planes for that pixel of the captured image. This approach may be employed because the green plane contains enough luminance signal information to make the desired crispening parameter determination; however, because the other planes also contain luminance signal information, sharpening is applied to those planes as well. In this embodiment, the kernel will be applied over the entire image with lambda being adaptively computed based, at least in part, on the image content; however, again, the invention is not limited in scope to this embodiment.

Figure 5:
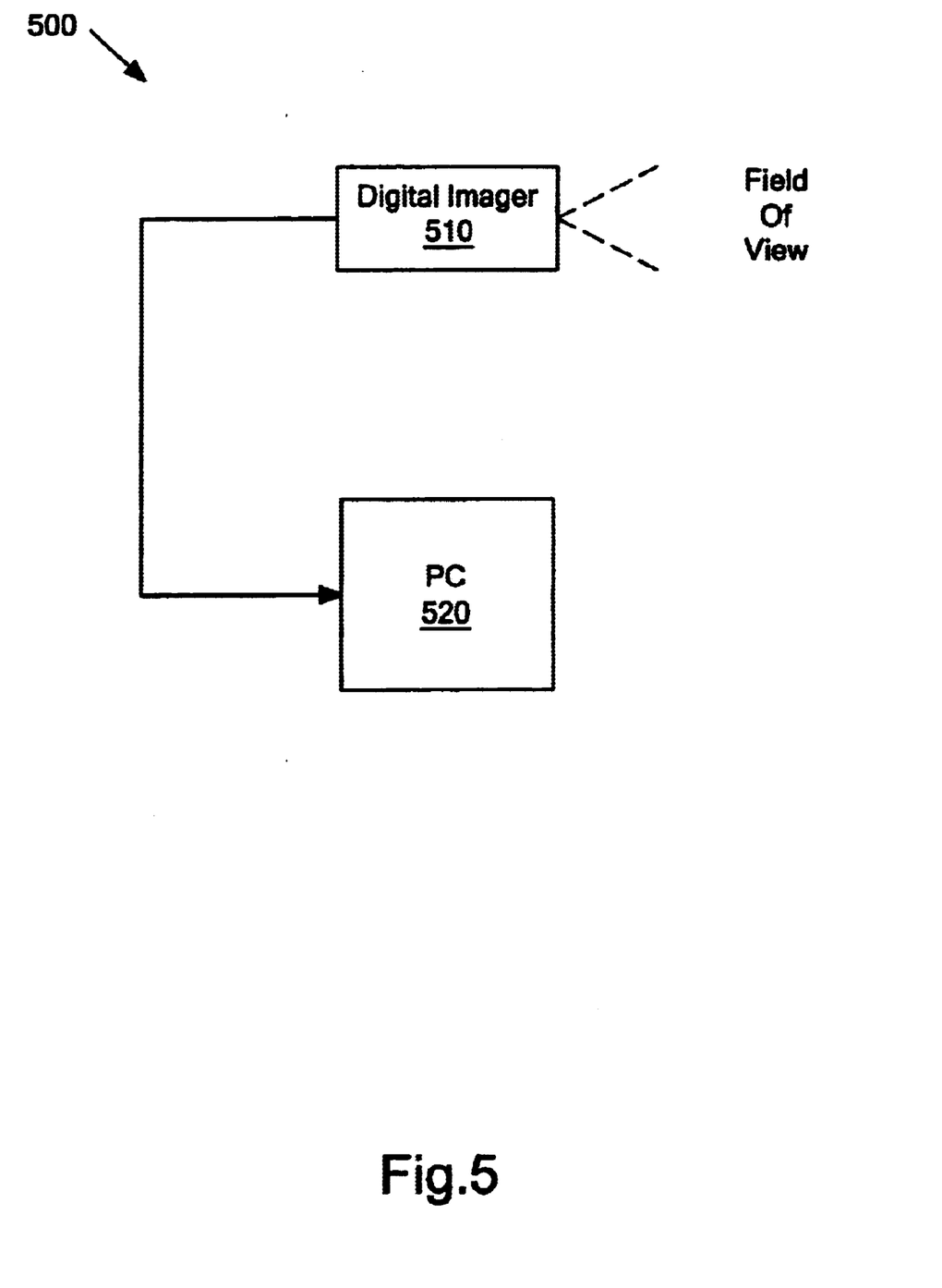
FIG. 5 is a schematic diagram illustrating an embodiment of a system that may employ an embodiment of a method of sharpening an image in accordance with the invention.

An aspect of the foregoing embodiments in accordance with the invention is the capability to automatically adjust the sharpening of an image or sequence of images based, at least in part, on the content of the image, and, in particular, the local content of the image. This results in the sharpened images being more visually pleasing than if, for example, a single kernel, that is, based on one crispening parameter, were applied to the entire image, or, if different crispening parameters were applied over the image on a basis other than the content of the image being sharpened. It will, of course, be understood by one of ordinary skill in the art that an embodiment in accordance with the invention may be implemented in hardware, software, or a combination thereof. For example, FIG. 5 illustrates an embodiment including a digital imager coupled to a computing platform, here a personal computer, such as a desktop or laptop. In this embodiment, imager 610 includes hardware to apply an embodiment in accordance with the invention to a captured image. Of course, alternative embodiments may include software or a combination of hardware and software. In this embodiment, after processing, the signals are transferred to PC 620, typically for additional processing.

While certain features of the invention have been illustrated as described herein, many modifications, substitutions, changes, and equivalents will now occur to those skill in the art. It is, therefore, to be understood that the appended claims are intended to cover all such modifications and changes as fall within the true spirit of the invention.

What is claimed is:

1. A method of sharpening an image comprising:

adaptively computing a crispening parameter for a local region of a captured image based, at least in part, on a measure of the local contrast and the local brightness, computing the crispening parameter substantially in accordance with the following relationship:

$$\text{Lambda}[I(m,n)] = g(L_I(m,n)) \times C_{I(m,n)}$$

where lambda[I(m,n)] is the crispening parameter for captured image I at pixel location (m,n), $C_{I(m,n)}$ is the computed amount of local contrast at that pixel location, and $g(L_{I(m,n)})$ is a scalar weight that is a function g of the luminance at that pixel location; and applying a kernel to the local region of the captured image using the adaptively computed crispening parameter.

2. A method of claim 1, wherein applying a kernel to the local region of the captured image comprises applying the kernel to that particular pixel of the captured image using the adaptively computed crispening parameter.

3. The method of claim 1, wherein the amount of local contrast is measured using the variance of the luminance values for the pixels of a predetermined local region around that particular pixel of the captured image and the degree of brightness is measured using the local luminance value for that particular pixel.

4. The method of claim 3, wherein the local luminance for that particular pixel comprises the luminance value at the pixel location for that particular pixel.

5. The method of claim 1, wherein g comprises a function that is piece-wise linear and divided into five contiguous regions based on the value of the luminance, $L_{I(m,n)}$.

6. The method of claim 5, wherein the five contiguous regions are specified as:

zero to $L_1$ (first region), $L_1$ to $L_2$ (second region), $L_2$ to $L_3$ (third region), $L_3$ to $L_4$ (fourth region), and above $L_4$; wherein $L_1 < L_2 < L_3 < L_4$ and $L_1$, $L_2$, $L_3$, and $L_4$ are positive; and wherein, for the first and fifth regions, g has the value zero, for the third region, g has a constant value, and, for the second and fourth regions, g is linearly increasing in value.

7. The method of claim 1, wherein the function g has the value zero over selected ranges of luminance, and, wherein, for pixels have a luminance value falling in those selected ranges, the amount of local contrast and the crispening parameter is not computed.

8. The method of claim 1, wherein the local region comprises a square of continguous pixels centered on the pixel (m,n).

9. The method of claim 1, wherein applying the kernel to that particular pixel comprises convolving the kernel with the captured image at that particular pixel location.

10. The method of claim 1, wherein the kernel comprises a square array of values with at least one of the values depending, at least in part, on the crispening parameter.

11. The method of claim 1, wherein the kernel comprises a three by three square array of values.

12. The method of claim 1, wherein the kernel comprises an array of values with at least one of the values depending, at least in part, on the crispening parameter.

13. The method of claim 1, wherein, over the entire image, the crispening parameter is adaptively computed and the kernel is applied.

14. An article comprising: a storage medium;

said storage medium having stored thereon, instructions, that, when executed, result in the following:

adaptively computing a crispening parameter for a local region of a stored image based, at least in part, on a measure of the local contrast and the local brightness, computing the crispening parameter substantially in accordance with the following relationship:

$$\text{Lambda}[I(m,n)] = g(L_{I(m,n)}) \times C_{I(m,n)}$$

where lambda[I(m,n)] is the crispening parameter for stored image I at pixel location (m,n), $C_{I(m,n)}$ is the computed amount of local contrast at that pixel location, and $g(L_{I(m,n)})$ is a scalar weight that is a function g of the luminance at that pixel location; and applying a kernel to the local region of the stored image using the adaptively computed crispening parameter.

15. The article of claim 14, wherein the instructions, when executed, further result in adaptively computing a crispening parameter for a particular pixel of the stored image based, at least in part, on a measure of the local contrast and the local brightness of the stored image with respect to that particular pixel; and applying the kernel to that particular pixel of the stored image using the adaptively computed crispening parameter.

16. The article of claim 14, wherein the amount of local contrast is measured using the variance of the luminance values for the pixels of a predetermined local region around that particular pixel of the stored image and the degree of brightness is measured using the local luminance value for that particular pixel.

17. The article of claim 16, wherein the local luminance for that particular pixel comprises the luminance value at the pixel location for that particular pixel.

18. The article of claim 14, wherein the instructions, when executed, further result in the crispening parameter is adaptively computed and the kernel is applied over the entire stored image.

19. A system comprising:

a digital imager;

said digital imager including the capability to adaptively compute a crispening parameter for a local region of a captured image based, at least in part, on a measure of the local contrast and the local brightness, computing the crispening parameter substantially in accordance with the following relationship:

$$\text{Lambda}[I(m,n)] = g(L_{I(m,n)}) \times C_{I(m,n)}$$

where lambda[I(m,n)] is the crispening parameter for stored image I at pixel location (m,n), $C_{I(m,n)}$ is the computed amount of local contrast at that pixel location, and $g(L_{I(m,n)})$ is a scalar weight that is a function g of the luminance at that pixel location.

20. The system of claim 19, wherein said digital imager further includes the capability to applying a kernel to the local region of the captured image using the adaptively computed crispening parameter.

21. The system of claim 19, further comprising a computing platform coupled to the digital imager.

22. The system of claim 21, wherein the computing platform comprises a personal computer.

23. The system of claim 22, wherein the personal computer comprises one of a laptop and a desktop computer.

24. The system of claim 19, wherein the crispening parameter is adaptively computed and the kernel is applied over the entire captured image.

* * * * *